(12) United States Patent
Demskie

(10) Patent No.: US 8,897,897 B2
(45) Date of Patent: Nov. 25, 2014

(54) COMPANION CONTROL INTERFACE FOR SMART DEVICES

(75) Inventor: John Michael Demskie, Prior Lake, MN (US)

(73) Assignee: Remote Technologies, Inc., Shakopee, MN (US)

( * ) Notice: Subject to any disclaimer, the term of this patent is extended or adjusted under 35 U.S.C. 154(b) by 469 days.

(21) Appl. No.: 13/115,363

(22) Filed: May 25, 2011

(65) Prior Publication Data

US 2012/0303138 A1 Nov. 29, 2012

(51) Int. Cl.
*G05B 11/01* (2006.01)
*G05B 15/00* (2006.01)
(Continued)

(52) U.S. Cl.
CPC ...... *H04N 5/4403* (2013.01); *H04N 2005/4425* (2013.01); *H04N 21/4227* (2013.01); *H04N 21/8193* (2013.01); *H04N 21/41407* (2013.01); *H04N 21/00* (2013.01)
USPC .................. 700/20; 700/19; 700/83; 700/94; 340/12.28; 340/12.53; 340/12.54; 340/4.31; 341/176; 348/734; 455/420; 455/556.2; 455/566; 725/59; 725/110

(58) Field of Classification Search
CPC ........... G08C 2201/20; G08C 2201/21; G08C 2201/30; G08C 2201/42; G08C 2201/92; G08C 2201/93; G08C 17/00; G08C 19/00; H04M 1/72533; H04M 1/72527; H04M 2250/02; H04M 2250/06; H04M 2250/22; H04N 5/4403; H04N 5/445; H04N 5/44; H04N 21/42225; H04N 21/4126; H04N 21/42204; H04N 21/42226; H04N 21/485; H04N 21/43615; H04N 21/6547; H04N 21/41407; H04N 21/42207; H04N 21/42684; H04N 2005/4435; H04N 2005/4407; G05B 2219/23039; G05B 2219/23077; G05B 2219/2615; H04L 12/2803; H04L 12/2816; H04L 12/2834; H04L 2012/2841; H04L 2012/2849
USPC ........ 700/2–7, 11, 17–20, 83, 84; 725/37, 38, 725/59, 109–113, 118–120, 131–134, 725/139–142, 151–153; 340/12.1, 12.15, 340/12.22–12.31, 12.4, 12.5–12.55, 340/13.2–13.22, 13.24–13.26; 341/173–176; 455/418–420, 550.1, 455/552.1, 553.1, 556.1, 556.2, 3.01, 3.06, 455/403; 710/8, 10, 62; 345/156, 173; 348/14.01–14.05, 211.99, 348/211.1–211.4, 211.6, 552, 725, 734
See application file for complete search history.

(56) References Cited

U.S. PATENT DOCUMENTS 6,407,779 B1 6/2002 Herz
6,553,345 B1 4/2003 Kuhn et al.
(Continued)

FOREIGN PATENT DOCUMENTS

KR 2011134603 A * 12/2011

*Primary Examiner* — Crystal J Barnes-Bullock
(74) *Attorney, Agent, or Firm* — Craig J. Lervick; Larkin Hoffman Daly & Lindgren, Ltd.

(57) ABSTRACT

A companion remote control system is usable with smart devices for controlling a plurality of controlled components. An overall control system includes: a companion remote configured for remote communication, and providing command options for a user desiring to interact with a controlled component; a software application configured for running on smart devices, which typically includes a graphical interface for the user to select desired controlled component from plurality of controlled components; and a control processor capable of communicating with companion remote, smart device and controlled components. The control processor is programmed to correlate user commands received from companion remote to appropriate instructions for a specific controlled component selection received from smart device. The control processor instructing the controlled component based on those commands, thereby allowing user to interact with selected controlled component using companion remote as if it was dedicated to that controlled component.

17 Claims, 1 Drawing Sheet

(51) Int. Cl.

| | | |
|---|---|---|
| G06F 17/00 | (2006.01) | |
| G05B 19/02 | (2006.01) | |
| G08C 19/16 | (2006.01) | |
| H04N 5/44 | (2011.01) | |
| H04M 3/00 | (2006.01) | |
| H04B 1/38 | (2006.01) | |
| G06F 3/00 | (2006.01) | |
| G06F 13/00 | (2006.01) | |
| H04N 21/4227 | (2011.01) | |
| H04N 21/81 | (2011.01) | |
| H04N 21/414 | (2011.01) | |
| H04N 21/00 | (2011.01) | |

(56) References Cited

U.S. PATENT DOCUMENTS

| | | | |
|---|---|---|---|
| 7,734,788 | B2 | 6/2010 | Karaoguz et al. |
| 8,150,387 | B2* | 4/2012 | Klein et al. .................... 455/420 |
| 8,432,490 | B2* | 4/2013 | Lee ................ 348/563 |
| 8,525,938 | B2* | 9/2013 | Haughawout et al. ........ 348/734 |
| 8,659,400 | B2* | 2/2014 | Arling et al. ............... 340/12.29 |
| 2001/0019367 | A1 | 9/2001 | Walton et al. |
| 2002/0044226 | A1 | 4/2002 | Risi |
| 2004/0215816 | A1* | 10/2004 | Hayes et al. ................... 709/238 |
| 2004/0236442 | A1 | 11/2004 | Maymudes |
| 2008/0088602 | A1 | 4/2008 | Hotelling |
| 2009/0094654 | A1* | 4/2009 | Sullivan et al. ................ 725/110 |
| 2009/0240502 | A1 | 9/2009 | Kemplin |
| 2010/0099396 | A1 | 4/2010 | Huq et al. |
| 2010/0245606 | A1 | 9/2010 | Karaoguz et al. |
| 2011/0260903 | A1* | 10/2011 | Wong ............................ 341/176 |
| 2011/0287757 | A1* | 11/2011 | Nykoluk et al. .............. 455/419 |
| 2011/0289113 | A1* | 11/2011 | Arling et al. .................. 707/769 |
| 2011/0302201 | A1* | 12/2011 | Ogaz et al. .................... 707/769 |
| 2011/0304443 | A1* | 12/2011 | Sheridan et al. ............. 340/12.5 |
| 2012/0041925 | A1* | 2/2012 | Pope et al. .................... 707/626 |
| 2012/0062468 | A1* | 3/2012 | Chen et al. .................... 345/173 |
| 2012/0064820 | A1* | 3/2012 | Bemmel ...................... 455/3.02 |
| 2012/0086563 | A1* | 4/2012 | Arling et al. ................ 340/12.52 |
| 2012/0116559 | A1* | 5/2012 | Davis et al. ..................... 700/94 |
| 2012/0119888 | A1* | 5/2012 | Reeves et al. .............. 340/12.24 |
| 2012/0151509 | A1* | 6/2012 | McCarthy et al. ................ 725/9 |
| 2012/0210268 | A1* | 8/2012 | Hilbrink et al. ............... 715/773 |
| 2012/0225645 | A1* | 9/2012 | Sivan ............................ 455/418 |
| 2012/0231837 | A1* | 9/2012 | Hilbrink et al. ............. 455/556.1 |
| 2012/0242526 | A1* | 9/2012 | Perez et al. ................... 341/176 |
| 2012/0277000 | A1* | 11/2012 | Vange ............................ 463/37 |
| 2012/0282914 | A1* | 11/2012 | Alexander .................... 455/420 |
| 2013/0035086 | A1* | 2/2013 | Chardon et al. .............. 455/420 |

\* cited by examiner

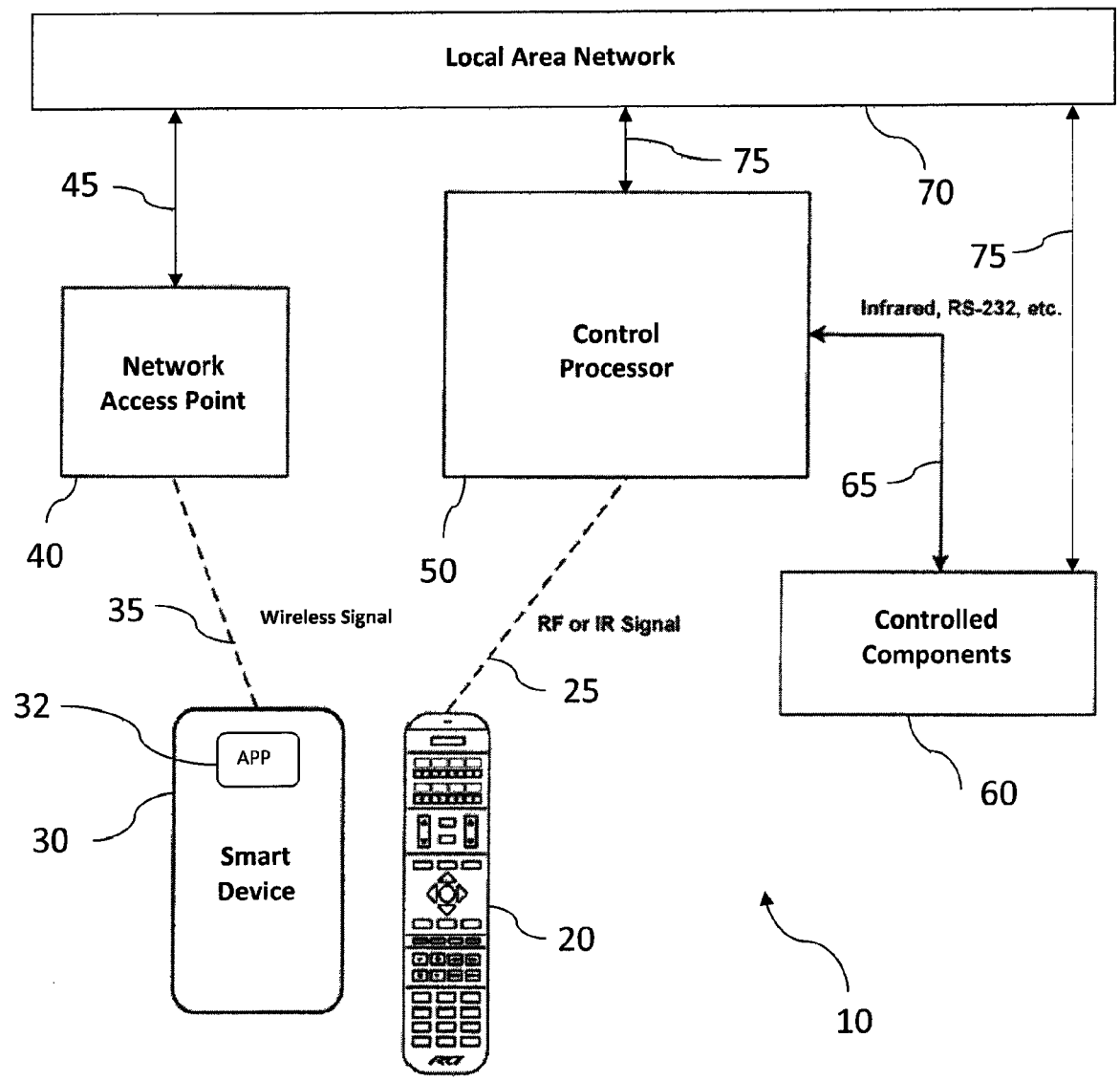

COMPANION CONTROL INTERFACE FOR SMART DEVICES

FIELD OF THE INVENTION

The present invention is generally related to remote control devices for controlling various systems. More specifically, the present invention relates to remote control devices and controlling systems used in conjunction with smart devices (e.g. smart phones).

BACKGROUND OF THE INVENTION

General automation systems are becoming more and more prevalent in homes, office buildings, hotels, and other facilities. Typical present day automation systems have the capability to provide the coordinated control of heating and/or cooling systems, security systems, audiovisual systems, lighting systems, appliances, communication systems, etc. For example, it is not uncommon for residential structures to have audiovisual systems which provide music and/or programming to multiple locations throughout the structure. A coordinated heating/cooling system could also be included to allow programmed control of the building temperature. Similarly, office buildings often have the need for audiovisual systems in conference rooms which provide media management, and data communications capabilities. An audiovisual control system may also include a network computer, thus providing the additional ability to access networks and/or the Internet via audiovisual displays. In yet another example, hotels and multi-unit residential facilities may incorporate automated systems to provide communication between rooms and a centralized service system providing desired amenities (concierge services, room service, etc.) In this example, each residence may include an interface unit interacting with a main desk, thus easily allowing messages and information to be easily communicated as necessary. Further, entertainment programming could likewise be distributed utilizing this same system, with programming being provided to individual rooms by a central system and played via in-room equipment.

Remote controls are widely utilized in many of the above-mentioned control systems. Remote control devices are becoming more and more sophisticated, providing additional convenience, capabilities and features. For example, compact displays in remote control devices are becoming more efficient and effective, thus providing the ability to clearly display significant amounts of information in a relatively small area. Additionally, processing power continues to increase, thus providing the ability to include relatively complex processors within compact remote control devices. Other notable features of present day remote controls include the ability to cooperate with multiple different devices as desired. As can be anticipated, several options are available which allow for the development of extremely powerful remote control devices.

With increased power and capability comes the added complexity of programming and/or operating these remote control devices. The ability to clearly communicate information required for a user to program or operate a handheld remote must be balanced with the need to keep these devices an appropriate and ergonomically acceptable size. Even with the continuing development in compact displays, the available area for conveying complex and often confusing information to the user is limited.

In addition, modern day handheld devices have become increasingly powerful. Examples of these devices include smart phones, music players, electronic tablets, etc. More specifically, these devices include the iPhone™, iPod Touch™ and iPad™ devices (manufactured and sold by Apple Inc.), smart phones and tablets by Blackberry™, Android™phones and tablets, and touch screen devices by Motorola, Samsung and others. These devices all include processors capable of performing multiple tasks and supporting many different "applications". One particular application allows these devices to control various devices using network connections such as WIFI or cellular networks. Using those communication techniques, these devices are able to transmit control signals to audio/visual equipment either directly via IP or using an additional hardware interface box. In essence, the user has the ability to utilize the interface of the handheld device to provide control signals to additional components.

When using this "remote control application" to control additional equipment, smart devices have a number of shortcomings. Most significantly, the handheld device must be running the actual remote control application to be effective. If a user switches to another application or uses the smart device in any other way, they must then "switch back" to the remote control application in order to produce and transmit control signals. For users who "multi-task", this can be very inconvenient, distracting and time consuming.

SUMMARY OF THE INVENTION

To effectively utilize the power of modern day smart devices, and to provide convenient operation of controlled equipment, the systems of the present invention coordinate the operation of an additional "basic" remote control in conjunction with the smart device. In one exemplary use, the smart device is initially used to configure the controlled components and to issue initial control signals. The system will recognize the desired actions/settings, and configure the "basic" or companion remote to operate in parallel. In this configuration, the user will have instant access to typical controls (e.g. play, stop, pause, vol. +, vol. −, etc.) while also allowing for alternative use of the smart device.

BRIEF DESCRIPTION OF THE DRAWINGS

Further objects and advantages of the present invention can be seen from reading the following detailed description of the preferred embodiments, in conjunction with the drawings in which:

FIG. 1 is an exemplary schematic diagram illustrating various components of an overall companion remote control system utilizing a smart device.

DETAILED DESCRIPTION OF PREFERRED EMBODIMENTS

Described below is an exemplary embodiment of the present invention along with a discussion of various features and capabilities. In this exemplary system, various components are shown for purposes of illustrating the overall operation of the present invention. It is understood, however, that modifications, substitutions and changes in actual components may be made without departing from the scope and spirit of the invention.

Referring to FIG. 1, a central component of control system setup 10 is a control processor 50, which includes multiple input and output ports, thus providing for flexible communication capabilities with various components. It is to be understood that control processor 50 may take many forms including a stand-alone device or a portion of a larger device or system. In communication with control processor 50 are a hand-held companion remote 20, a local area network 70 and one or more controlled components 60. As examples, controlled components may include items such as televisions, DVD players/recorders, CD players/recorders, tuners, other audiovisual entertainment devices, thermostats and other controllable environmental devices. As suggested above, control processor 50 includes a microprocessor or microcontroller capable of coordinating operation of the entire control system setup 10.

Control system setup 10 also includes a smart device 30 capable of communicating with the local area network 70 through a wireless network access point 40. It will be understood that this communication with the network could also be achieved using alternative communication methods, such as Bluetooth, Zigbee, cellular networks (e.g. 3G), etc. The smart device 30 includes any programmable "smart" device, preferably having a touch screen graphical interface. Again, these may include smart phones (i.e., Android™, iPhone™, Blackberry™, etc.), tablets, laptops or other personal computers. One or more of these types of devices are readily available in many homes in the United States, making them a low cost option for interfacing with the control processor 50.

Unfortunately, these types of smart devices 30 have poor ergonomics for control tasks that require frequent interaction with the interface (e.g. volume adjustment, channel changing, stop, play, etc.) In addition, the smart device 30 may not be readily available at every moment when someone desires to interface with the control processor 50. This is often due to the smart device 30 being powered down, being used by another person or being used for another task, such as talking on the phone.

The companion remote 20 resolves these issues when used in conjunction with a smart device 30. A software application 32, commonly referred to as an "app," is designed to run on a general purpose smart device 30. Variations in the app 32 are available to conform the app 32 to the requirements of the different smart device platforms. Among other functions, the app 32 communicates with the control processor 50 via a wireless signal 35 to a network access point 40, which has a connection 45 to the local area network 70. Also in communication with the network 70 is a control processor 50 (connected via connection 75.) Typically, this network is configured as a home WIFI network using well known wireless equipment. Again, many different connection techniques could be used, such as those using cellular signals, bluetooth signals, etc. It is also possible for smart device 30 to be hardwire connected to local area network 70 via appropriate cables (not shown). The app 32 provides easy, user-friendly graphic interface screens for users to indicate their choice of controlled components 60, and to view status feedback, metadata, etc. from controlled components 60.

Companion remote 20 is not programmable in the same manner, and does not need to be configured by the user. It does, however, require a unique identification number embedded in the hardware or internal software. In addition, companion remote 20 includes a number of well understood and common control buttons, and includes appropriate communication programming to transmit the users desired actions to control processor 50. Activation of the various buttons on companion remote 20 results in a unique identifiable signal to be transmitted which is recognized by control processor 50. Companion remote 20 communicates with control processor 50 via any appropriate communication method 25, including but not limited to one-way RF, bi-directional RF, infrared, hardwired, etc. Control processor 50 stores all of the command data and thus communicates the needed commands to the controlled components 60 through any suitable communication methods 65, such as infrared, RS-232, etc. Control processor 50 keeps track of selected controlled component(s) 60 and generally coordinates the transmission of appropriate signals to all related devices. Using stored programming, control processor 50 also correlates the button presses on the companion remote 20 with the commands for the currently selected controlled component 60.

All of the configurations and choices concerning the available controlled components 60 are handled with the easy-to-use graphic interface on the smart device 30. Using stored app 32, smart device 30 continues to provide the ability to control any of the controlled components 60. In use, control processor 50 will help to coordinate signals coming from smart device 30 in order to provide the control functions desired, and to provide overall coordination for control system setup 10. In addition, control processor 50 interprets the command choices received from companion remote 20 as if companion remote 20 was dedicated only to that particular selected controlled component 60. Control processor 50 then sends the appropriate instructions to controlled component 60 based on the received commands from companion remote 20. However, when the user makes another choice of controlled component 60, companion remote 20 becomes a dedicated command device for the newly selected controlled component 60 through the interpretation by control processor 50.

The present invention provides a unique solution having all the elements of a robust, high-end control system. It provides a rich graphical interface, user friendly ergonomics and highly reliable operation in a seamless, low cost package. The three primary components of the invention, companion remote 30, programmable control processor 50 and the software application are versatile and easily adjusted to fit a user's needs. Using the coordinated companion remote also reduces, if not eliminates, the frustration of today's complex and confusing universal remote controls.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A companion remote control system to be used with a smart device for controlling a plurality of controlled components, the system comprising:

a companion remote control unit configured for remote communication, the companion remote control unit providing a predetermined set of labeled buttons corresponding to a plurality of user commands available to a user desiring to interact with a controlled component;

a software application configured for running on the smart device, the software application providing a graphical interface for the user to designate a selected controlled component from the plurality of controlled components; and a control processor capable of communicating with the companion remote, the smart device and the plurality of controlled components, the control processor programmed to receive communication from the smart device identifying the selected controlled component and to receive communication from the companion remote indicative of the user commands, the control processor further programed to correlate the user commands received from the companion remote to appropriate instructions for the selected controlled component, with the control processor thus instructing the selected controlled component based on the user commands received from the companion remote, thereby allowing the user to interact with the selected controlled component using the companion remote as if the companion remote was dedicated to the selected controlled component.

2. The control system of claim 1 wherein the control processor is programmed to re-correlate the user commands received from the companion remote to appropriate instructions for a different controlled component upon receipt from the smart device of a changed selection of controlled component.

3. The control system of claim 2 wherein the selections of controlled components are received by the control processor from the smart device via a local area network.

4. The control system of claim 3 wherein the smart device communicates with the local area network, and thus the control processor, using wireless signals.

5. The control system of claim 1 wherein the companion remote includes a unique identification number to accommodate exclusive communication with the control processor.

6. The control system of claim 1 wherein the software application is configurable for simultaneously running on a plurality of different smart devices.

7. A method of controlling a plurality of controlled components using a companion remote control system in conjunction with a smart device, the method comprising:
   providing a companion remote control unit configured for remote communication, the companion remote control unit presenting command options for a user desiring to interact with a one of the plurality of controlled components, and transmitting signals indicative of any selected command options;
   providing a software application configured for running on the smart device, the software application creating a graphical interface for the user to select a desired controlled component from the plurality of controlled components, the software application further configured to cause the smart device to transmit a signal indicative of the selected desired controlled component;
   providing a control processor capable of communication with the companion remote, the smart device and the plurality of controlled components;
   programming the control processor to receive the signals from the companion remote control unit and the smart device, and to correlate the user commands received from the companion remote to appropriate instructions for the desired controlled component as selected by the smart device; and
   instructing the desired controlled component based on the correlated commands, thereby allowing the user to interact with the selected controlled component using the companion remote as if the companion remote was dedicated to the desired controlled component.

8. The method of claim 7 further comprising programming the control processor to re-correlate the user commands received from the companion remote to appropriate instructions for a different controlled component upon receipt from the smart device of a different selection of controlled component.

9. The method of claim 8 wherein the control processor receives the selections of controlled components from the smart device via a local area network.

10. The method of claim 7 wherein the control processor receives the selection of the controlled component from the smart device via a local area network and wherein the smart device communicates with the local area network, and thus the control processor, using wireless signals.

11. The method of claim 7 wherein the companion remote includes a unique identification number and a plurality of buttons having predetermined labels and wherein the activation of the plurality of buttons produces a corresponding set of predetermined signals to be transmitted from the companion remote.

12. The method of claim 7 wherein the software application is configurable for simultaneously running on a plurality of different smart devices.

13. A system for providing the coordinated control of a plurality of controlled components using alternative interfaces, the alternative interfaces including a smart device which has the ability to provide control signals via a network to the plurality of controlled components, the system comprising:
   a companion remote having a plurality of defined interface buttons, a transmitter and a microcontroller, wherein the microcontroller coordinates the transmission of control signals which correspond to the defined interface buttons; and
   a control processor having a memory, a network connection and a receiver, the memory storing programming to coordinate the overall control of the controlled components based upon signals received from the companion remote and the smart device, wherein the control processor receives signals from the smart device via the network connection and establishes a selected controlled component based upon the signals received from one of the alternative interfaces, and wherein the control processor further receives signals from the companion remote via the receiver corresponding to a desired operation, the stored programming within the control processor thus processing the signals received from the companion remote and providing appropriate signals to the selected controlled component to achieve the desired operation.

14. The system of claim 13 wherein the selected controlled component is selected by a user interfacing with the smart device and the control processor receiving appropriate signals via the network.

15. The system of claim 13 wherein the transmitter of the companion remote and the receiver of the control processor are configured for communication with one another using communication techniques selected from the group of rf wireless signals, it wireless signals, wired signals, Bluetooth signals, zigbee signals or network communication.

16. The system of claim 13 wherein the companion remote includes a unique identification number identifiable by the control processor.

17. (Newly Presented) The system of claim 13 further comprising a software application configured to run on the smart device, the software application providing a graphical interface for the user to select the selected controlled component, and to produce the signals for transmission to the control processor which establish the selected controlled component.

* * * * *

UNITED STATES PATENT AND TRADEMARK OFFICE
CERTIFICATE OF CORRECTION

| | | |
|---|---|---|
| PATENT NO. | : 8,897,897 B2 | Page 1 of 1 |
| APPLICATION NO. | : 13/115363 | |
| DATED | : November 25, 2014 | |
| INVENTOR(S) | : John Michael Demskie | |

It is certified that error appears in the above-identified patent and that said Letters Patent is hereby corrected as shown below:

In the Claims

Column 6, line 54, (in claim 15):

"it" should be changed to -- ir --

Signed and Sealed this
Fifth Day of May, 2015

Michelle K. Lee
*Director of the United States Patent and Trademark Office*